United States Patent [19]

Noguchi et al.

[11] Patent Number: 5,172,265

[45] Date of Patent: Dec. 15, 1992

[54] MICROSCOPE WITH SALIENT HAND-SUPPORT

[75] Inventors: Motoki Noguchi, Chigasaki; Shuji Toyoda, Yokohama, both of Japan

[73] Assignee: Nikon Corporation, Tokyo, Japan

[21] Appl. No.: 854,787

[22] Filed: Mar. 23, 1992

Related U.S. Application Data

[63] Continuation of Ser. No. 584,132, Sep. 18, 1990, abandoned.

[30] Foreign Application Priority Data

Sep. 22, 1989 [JP] Japan .............................. 1-111074[U]

[51] Int. Cl.$^5$ .............................................. G02B 21/24
[52] U.S. Cl. ..................................... 359/368; 359/382; D16/131
[58] Field of Search ........................ 350/507, 521, 528; D16/131; 359/368, 382, 390

[56] References Cited

U.S. PATENT DOCUMENTS

| | | | |
|---|---|---|---|
| D. 273,592 | 4/1984 | Armbruster | D16/131 |
| D. 276,351 | 11/1904 | Junke et al. | D16/131 |
| D. 296,904 | 7/1988 | Lukaszewski | D16/131 |
| 4,299,440 | 11/1981 | Hodgson | D16/131 |
| 4,770,518 | 9/1988 | Emmel | 350/528 |
| 4,824,229 | 4/1989 | Narita et al. | D16/131 |

*Primary Examiner*—Jon W. Henry
*Attorney, Agent, or Firm*—Shapiro and Shapiro

[57] ABSTRACT

A microscope placeable on a table comprises a bodytube for holding an optical system, a stage on which a specimen is placed, a stand for supporting the bodytube and the stage, a base supporting the stand and having a bottom surface which is placed upon the upper surface of the table, a focusing operation member rotatively operably provided on the stand for moving one of the bodytube and the stage along the optical axis, and a hand-placing portion protruded from a side of the base and provided near the focusing operation member and formed so that the lower end of the protruded portion may be spaced apart by at least a predetermined distance from a plane containing the bottom surface.

12 Claims, 4 Drawing Sheets

MICROSCOPE WITH SALIENT HAND-SUPPORT

This is a continuation of application Ser. No. 584,132 filed Sept. 18, 1990, now abandoned.

BACKGROUND OF THE INVENTION

1. Field of the Invention

This invention relates to a microscope, and in particular to the structure of the support frame thereof for supporting a body tube and a stage.

2. Related Background Art

The base of a microscope is a portion located at the lowermost portion of the support frame of the microscope, and is generally formed into a horseshoe shape or a square shape. The square-shaped base has the function of stably supporting the overall structure and the function of maintaining the stability of the position of a hand when a focusing handle for focusing or a stage handle for moving a specimen is manipulated.

In order to accomplish the above functions, it is preferable that the square-shaped base of the microscope be sufficiently larger in its bottom surface (footprint) than a structure above the base, for example, a stand, an arm or the like. However, to allow space for placing recording paper on a table on which the microscope is placed or the depiction surface when a depicting apparatus is used with the microscope, it is preferable that the bottom surface of the base of the microscope be small. Thus, the base has heretofore been of a minimum necessary size to keep the stability of the whole microscope.

In such a prior-art microscope, as shown, for example, in FIGS. 3 and 4 of the accompanying drawings, focusing handles 120a and 120b are provided at right and left sides on a stand 102 standing upright on a base 101, and a stage handle 130 for moving a specimen is provided on a stage 103 vertically movable in the direction of the optical axis 4 of an objective lens by the rotation of the focusing handles 120a and 120b.

In the prior-art microscope, the focusing handles 120a and 120b and hand-placing portions 101a and 101b just beneath the stage handle 130 are small, as shown in FIG. 4. Therefore he stability of hands when the handles 120a, 120b and 130 are manipulated is not good, although a depiction surface 105 may be secured and recording paper or the like can be placed close by, in contact with a side of the base 101.

The prior-art microscope base as described above is of a minimum necessary size to keep the stability of the whole microscope, and this leads to the disadvantage that when a focusing handle for focusing or the stage handle for moving the specimen is manipulated, there is insufficient support for the side of the hand.

Also, if the base of the microscope has simply been made wider, there has been the disadvantage that although the stability of support for the hand is improved, it becomes impossible to provide space for placing recording paper or the like or the depiction surface when a depicting apparatus is used with the microscope.

In some cases, an auxiliary member for placing a hand thereon is placed so as to be in contact with a side of the hand-placing portion of the base of the microscope in order to improve the stability of support for the hand during the manipulation of the handles. However, if the auxiliary member is placed so as to be in contact with a side of the hand-placing portion of the base of the microscope, there is the disadvantage that although the stability of support for the hand can be improved and the depiction surface can be secured, the space on the desk for placing recording paper or the like will be insufficient.

SUMMARY OF THE INVENTION

Accordingly, it is an object of the present invention to solve the above-noted disadvantages peculiar to the prior art and to provide a microscope having a base which can realize the stability of the whole microscope, the stability of support for a hand and the provision of a space for placing recording paper or the like and a the same depiction surface at a time.

To achieve the above object, the present invention provides a microscope to be placed on a table, characterized by the provision of a microscope stand for supporting a microscope bodytube holding a microscope optical system and a stage on which a specimen is placed, a microscope base supporting said microscope stand and having a bottom surface which is placed on the upper surface of the table, a focusing operation member rotatively operably provided on said microscope stand for moving one of said microscope bodytube and said stage along the optic axis of said microscope, and a hand-placing portion protruded from a side of said microscope base and provided near said focusing operation member and formed so that the lower end of the protruded portion may be spaced apart by at least a predetermined distance from a plane containing the bottom surface of said placed on in contact By the above-described construction, the area of the hand-placing portion can be sufficiently provided so that it becomes possible to stably support the hand when the focusing operation member is manipulated. Also, since the lower end surface of the hand-placing portion is at a position higher than a predetermined level above the bottom surface of the base, recording paper or the like can be placed in proximity to a side of the base. Further, since the hand-placing portion is provided near the operation member far from the optical axis of an objective lens, it is possible to optimally position the depiction surface when a microscopically examined image is depicted at the same time.

Other objects, features and advantages of the present invention will become fully apparent from the following detailed description taken in conjunction with the accompanying drawing.

DESCRIPTION OF THE PREFERRED EMBODIMENT

An embodiment of the present invention will hereinafter be described in detail with reference to the accompanying drawings.

Figure 1:
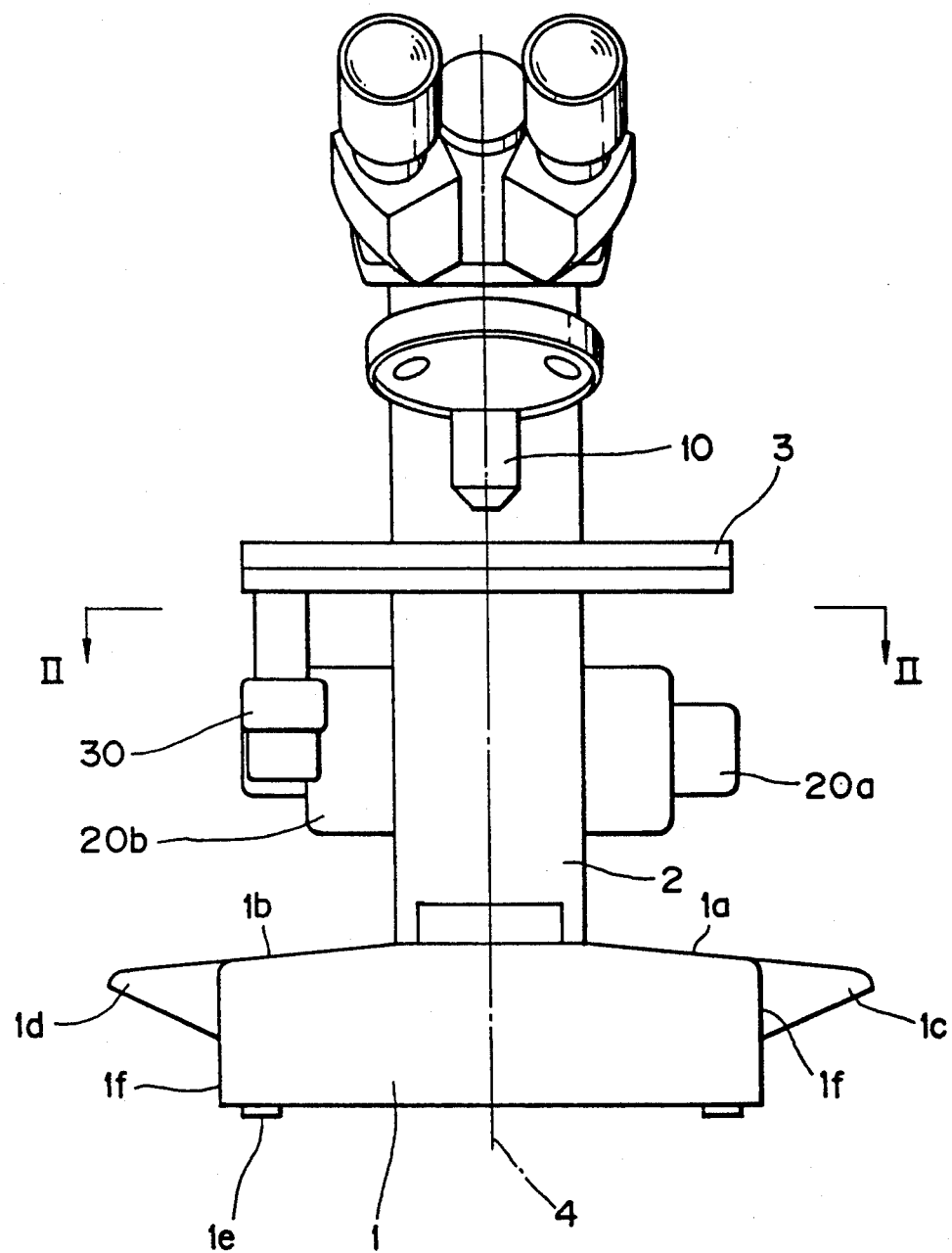
FIG. 1 is a front view of a microscope according to an embodiment of the present invention.

Referring to FIG. 1 which is a front view schematically showing the construction of a microscope according to an embodiment of the present invention, focusing handles 20a and 20b for vertically moving a stage 3 for the purpose of focusing are provided on the right and left sides of a stand 2 formed upright on a base 1 toward the rear end R (FIG. 2) of the base, the base 1 forming a portion of the support frame of the microscope. The stage 3 is designed to be vertically moved along the optical axis 4 of an objective lens 10 in response to the rotation of the focusing handles 20a and 20b, and a stage handle 30 for moving a specimen on the stage 3 is provided on the stage 30. An illuminating window 40 centered about the optical axis 4 of the objective lens for illuminating the specimen on the stage 3 is provided in the upper surface of the base 1 which is just beneath the objective lens.

Further, on that portion of the microscope base 1 forming a part of the support frame which is just beneath the focusing handles 20a, 20b and the stage handle 30, there are provided, in addition to hand-placing portions 1a and 1b corresponding to the conventional hand-placing surfaces, overhanging hand-placing portions 1c and 1d protruded from sides 1f above the bottom surface 1e of the base 1. Thus wide hand-placing surfaces of the present embodiment are formed by the hand-placing portion 1a and the overhanging hand-placing portion 1c, and by the hand-placing portion 1b and the overhanging hand-placing portion 1d so that the stability of support for the hands becomes very good during the manipulation of the handles 20a, 20b and 30.

The overhanging hand-placing portions 1c and 1d are not provided laterally of the optical axis 4 of the objective lens. Thus, as viewed in FIG. 2, each portion 1c and 1d projects laterally outwardly from the adjacent lengthwise portion of the corresponding side of the base, the latter portion being closer to the front end F of the base. Accordingly, a depiction surface 5 is well accommodated toward the front end F of the base at either side. Also the overhanging hand-placing portions 1c and 1d overhand from the sides 1f a predetermined distance above the bottom surface 1e of the base and therefore, the shape of the bottom surface 1e of the base is the same as the conventional one. This leaves ample space below the overhanging hand-placing portions 1c and 1d so that recording paper or the like can be placed in proximity to the sides 1f. As shown in FIG. 1, the undersurfaces of the hand-placing portions 1c and 1d preferably incline laterally outwardly upwardly with respect to the microscope base 1.

Figure 2:
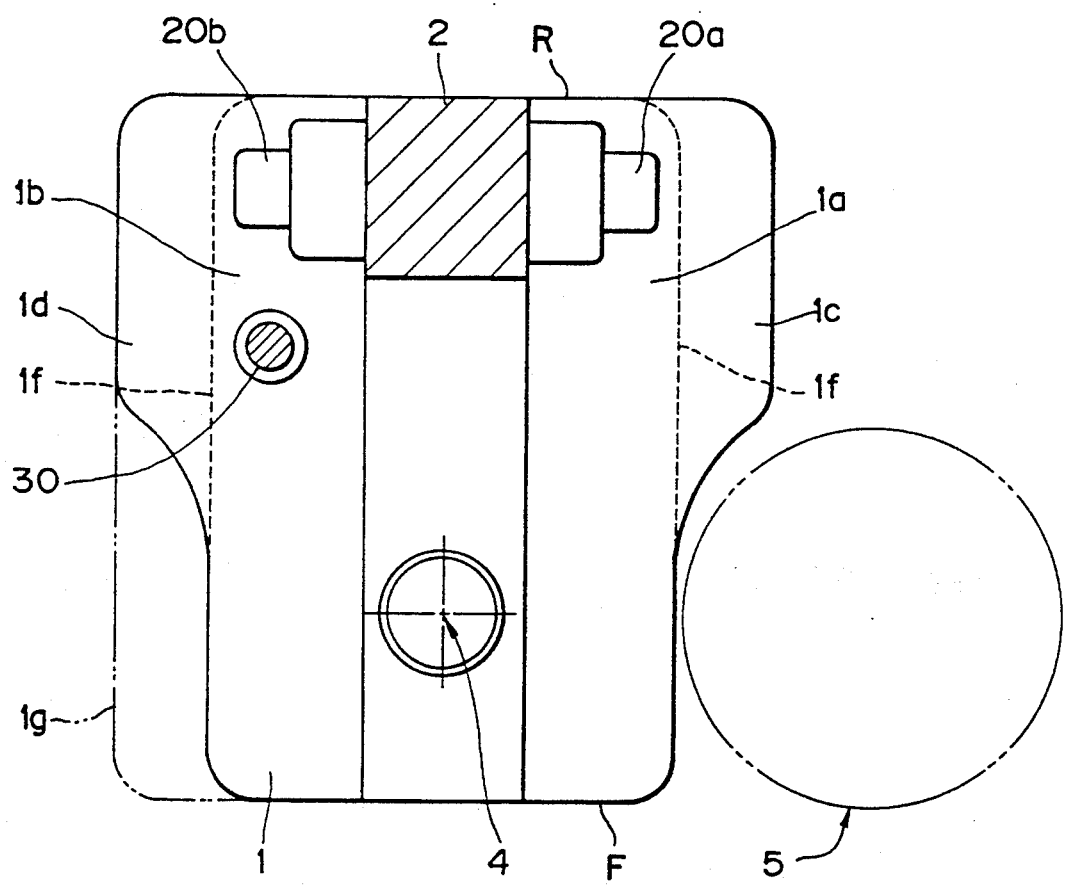
FIG. 2 is a cross-sectional view taken along line II—II of FIG. 1.
Figure 3:
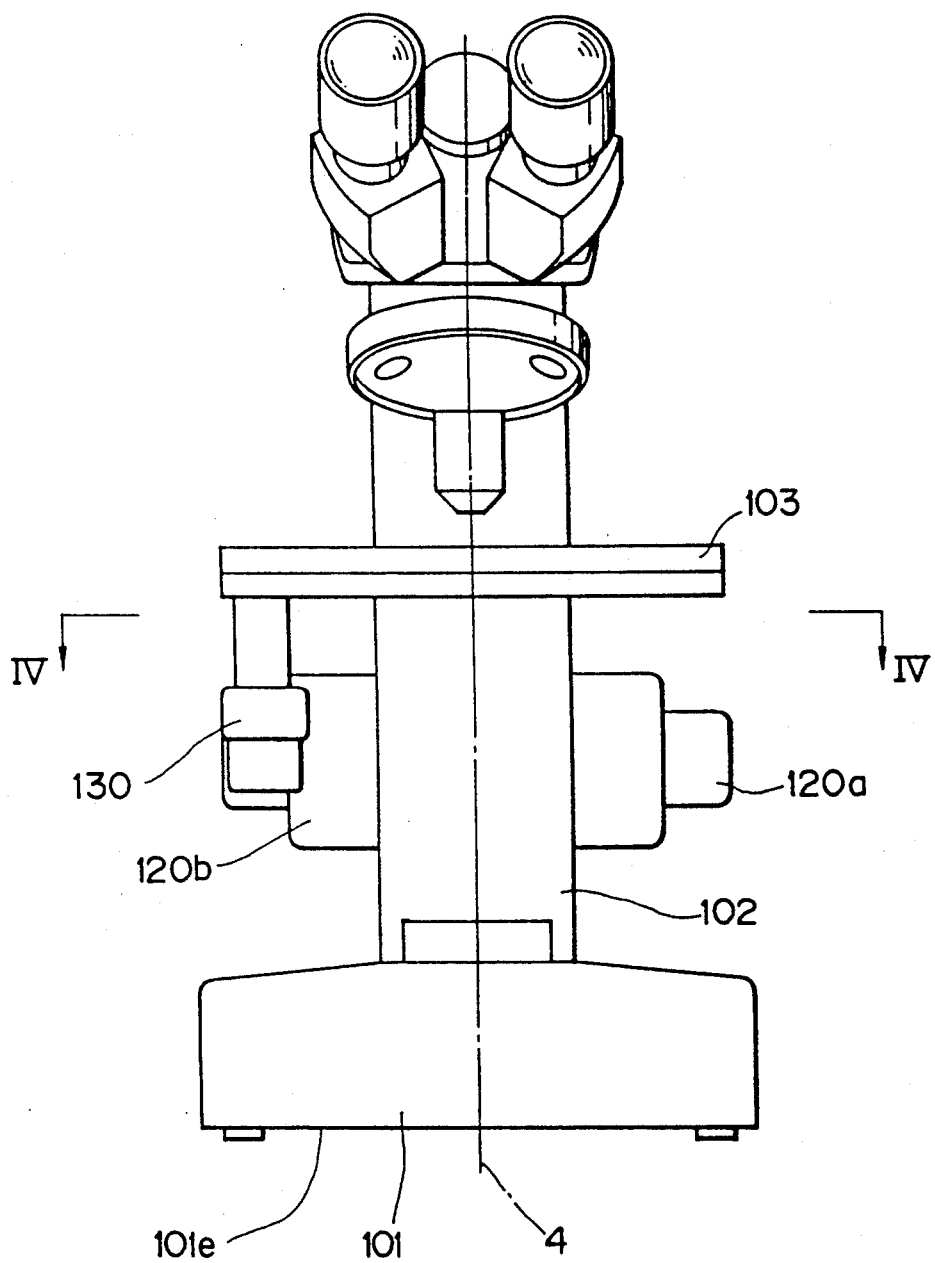
FIG. 3 is a front view of a microscope according to the prior art.
Figure 4:
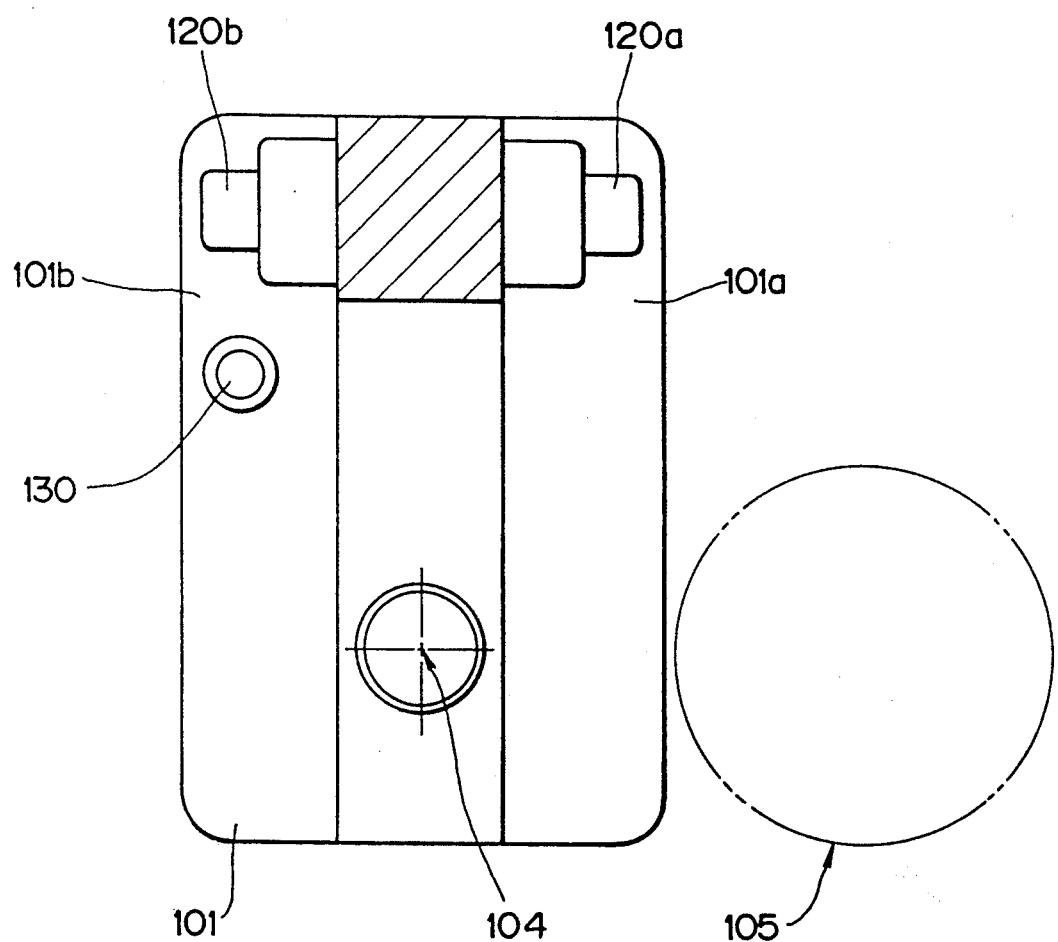
FIG. 4 is a cross-sectional view taken along line IV—IV of FIG. 3.

When depiction is not required, the overhanging hand-placing portions 1c and 1d may be, extended to points laterally of the optical axis 4 of the objective lens. As another example, if the overhanging hand-placing portion 1d is formed not partially as described above, but in a wide rectangular shape as indicated in phantom by line 1g in FIG. 2, the stage handle 30 will even easier to manipulate. The overhanging hand-placing portions 1c and 1d. Thus need not be bilaterally symmetrical as shown in FIGS. 1 and 2. Further, if the overhanging hand-placing portions 1c and 1d are designed to be removably mountable to the sides 1f of the base by well-known mounting means such as screwing or fitting, they can be retrofit to a conventional base to provide the advantages discussed herein.

While the above embodiment has been described with respect to a case where the present invention is applied to an erect type microscope, the present invention is equally applicable to an inverted type microscope. Also, in the above-described embodiment, design is made such that the stage 3 is vertically moved relative to the objective lens 10 by the manipulation of the focusing handles 20a and 20b, but alternatively, the microscope may be designed such that the microscope bodytube including the objective lens 10 is moved.

As described above, according to the present invention, the stability of the whole microscope can be secured, the stability of hands which manipulate various handles is greatly improved, and ample space for placing recording paper or the like and a depiction surface can also be provided.

What is claimed is:

1. A microscope, comprising:
   a bodytube holding an optical system including an objective lens;
   a stage on which a specimen is to be placed;
   a stand supporting said bodytube and said stage;
   a base supporting said stand toward a rear end of said base and configured for placement on an upper surface of a table-like support, said base having a top surface for hand placement thereon and a bottom surface; and
   a rotatable focusing operation member provided on said stand for moving one of said bodytube and said stage along an optical axis of said objective lens; and
   wherein, as viewed downwardly toward said top surface along said optical axis, said base has, along the length of one side thereof, a salient hand-support which is disposed near said focusing operation member and which projects laterally outwardly relative to an adjacent lengthwise portion of said one side disposed closer to a front end of said base, with a bottom surface of said hand-support being spaced above said bottom surface of said base.

2. A microscope according to claim 1, wherein a said focusing operation member is provided protrudingly to each of two opposite sides of said stand, and a respective said hand-support is provided along each of corresponding opposite sides of said top surface of said base.

3. A microscope according to claim 2, wherein said bottom surface of each hand-support is inclined laterally outwardly upwardly with respect to said base.

4. A microscope according to claim 1, wherein a top surface of said hand-support is substantially coplanar with an adjacent region of said top surface of said base.

5. A microscope according to claim 1, wherein said bottom surface of said hand-support is inclined laterally outwardly upwardly with respect to said base.

6. A microscope according to claim 1, wherein said hand-support is about half as long as said one side of said base.

7. A microscope, comprising:
   a bodytube holding an optical system including an objective lens;
   a stage on which a specimen is to be placed;
   a stand supporting said bodytube and said stage;
   a base having a top surface for hand placement thereon and a bottom surface for placement on an upper surface of a table-like support, said base supporting said stand thereon at a position spaced in a first direction along said top surface from a position at which an optical axis of said objective lens passes through said top surface; and
   a rotatable focusing operation member provided on said stand for moving one of said bodytube and said stage along said optical axis of said objective lens; and
   wherein said base has a salient hand-support disposed near said focusing operation member along one side of said top surface such that the dimension of said base perpendicular to said first direction and to said optical axis is greater near said focusing operation member than near the position at which said optical axis passes through said top surface, with a bottom surface of said hand-support being spaced above said bottom surface of said base.

8. A microscope according got claim 7, wherein a said focusing operation member is provided protrudingly to each of two opposite sides of said stand, and a respective said hand-support is provided along each of corresponding opposite sides of said top surface of said base.

9. A microscope according to claim 8, wherein said bottom surface of each hand-support is inclined outwardly upwardly with respect to said base in a respective direction perpendicular to said first direction and to said optical axis.

10. A microscope according to claim 7, wherein a top surface of said hand-support is substantially coplanar with an adjacent region of said top surface of said base.

11. A microscope according to claim 7, wherein said bottom surface of said hand-support is inclined outwardly upwardly with respect to said base in a direction perpendicular to said first direction and to said optical axis.

12. A microscope according to claim 7, wherein the length of said hand-support in said first direction is about half the length of said base in said first direction.

* * * * *